United States Patent Office 3,698,932
Patented Oct. 17, 1972

3,698,932
ARTICLES HAVING A LOW FRICTION SURFACE AND PROCESS OF MAKING SAME
Sheldon W. Dean, Hamden, Conn., assignor to Olin Corporation
Filed Jan. 25, 1971, Ser. No. 109,197
Int. Cl. B23p *3/00;* B44d *1/14*
U.S. Cl. 29—195 R                    12 Claims

ABSTRACT OF THE DISCLOSURE

A substrate or article having a low friction surface and the process of making the same. The article consists of a metal base selected from aluminum, titanium, zirconium, tungsten, niobium, magnesium, nickel and their alloys and stainless steels. The metal base has a surface on which is formed a three layer low friction coating. The first layer adjacent the metal base comprises a metal selected from zinc, cadmium, bismuth, tin, antimony, lead, iron, copper and copper alloys. The second layer formed over the first layer comprises a metal soap or salt of the first layer and the third layer formed over the second layer comprises a fatty acid. Generally, the second layer is formed by reacting in part the first and third layers. The low friction surface provides articles such as fasteners, lamp bases, deep drawing blanks, etc. which are able to convert a greater degree of applied torque to working force than low friction surfaces comprising a metal soap or fatty acid alone.

BACKGROUND OF THE INVENTION

The metals aluminum, titanium, zirconium, tungsten, niobium, magnesium, nickel and their alloys and stainless steels are generally covered by a thin oxide layer which forms spontaneously in air. When such metals and alloys or articles made of them are formed at elevated temperatures, they tend to have particles of oxide distributed over their surfaces. These oxides tend to be brittle and very abrasive so that the fabrication of articles made from these metals is accompanied by excessive wear of fabrication dies and scratching or gauling of the metal surface.

SUMMARY OF THE INVENTION

The instant invention comprises a substrate or article made from one of the above metals wherein the oxide layer has been replaced by a thin layer of metal selected from zinc, cadmium, bismuth, tin, antimony, lead, iron, copper and copper alloys. This thin metal layer in turn is coated with a fatty acid such as stearic acid. The fatty acid reacts with the thin metal layer to form a three layer coating adjacent to the surface of the metal substrate or article comprising: a metallic layer of zinc, cadmium, bismuth, etc.; a layer comprising a metal salt or soap formed by reaction of the fatty acid and the metal layer; and a layer of the fatty acid. These three layers provide metal substrates or articles with a very low coefficient of friction surface and more importantly, they provide unique anti-gauling and extreme pressure lubrication properties. The elimination of the oxide coating from the metal article reduces the tendency for the article to fracture when being worked and the low friction antigauling surface comprising the three layers makes them less prone to scratching and marring in fabrication.

The invention also comprises a process to provide substrates or articles as enumerated above having the inventive low friction surface. The process involves coating the metal substrate or article of aluminum, titanium, zirconium, etc. with a metal selected from zinc, cadmium, bismuth, etc. such that the metallic coating substantially replaces the oxide layer on the metal substrate or article. The coated substrate or article is then further coated with a fatty acid which reacts with the metal coating to form a metallic salt or soap such as, for example, zinc stearate. The metallic layer, the metallic salt or soap layer and the fatty acid layer on the surface of the metal substrate or article play an important role on the development of the extreme pressure lubrication properties as aforenoted.

It is known to form metallic layers on the surfaces of any of the subject metallic substrates or articles as a preliminary treatment to electro-plating. It is also known to coat the unplated metallic substrates or articles with a fatty acid to provide lubrication. In accordance with the instant invention, however, it has been found that the combination of the three layers as enumerated above, provides a low friction surface which shows a synergistic improvement in frictional properties as compared to either the metal base coated with the metallic layer alone or the metal base coated with a fatty acid alone.

It is accordingly an object of this invention to provide a process for obtaining an improved low friction surface on metal substrates or articles made of metals selected from aluminum, titanium, zirconium, tungsten, niobium, magnesium, nickel and their alloys and stainless steels.

It is a further object of this invention to provide a process of coating a substrate or article as above, with a thin layer of zinc, cadmium, bismuth, tin, antimony, lead, iron, copper or copper alloys which coating is then coated with a fatty acid.

It is a further object of this invention to provide a substrate or article having a low friction anti-gauling surface comprising a metal base selected from aluminum, titanium, zirconium, tungsten, niobium, magnesium, nickel and their alloys and stainless steels.

It is a further object of this invention to provide a substrate or article comprising a metal base selected from aluminum, titanium, zirconium, tungsten, niobium, magnesium, nickel and their alloys and stainless steels having a low friction surface formed upon a surface of the metal base comprising three layers, the first layer being a metal coating selected from zinc, cadmium, bismuth, tin, antimony, lead, iron, copper and copper alloys, the second layer being a metal soap or salt of the metal of the first layer, and the third layer being a fatty acid.

It is a further object of this invention to provide a substrate or article and process of making same wherein the metal base is selected from aluminum, titanium, magnesium, nickel and their alloys and stainless steels, and wherein the metal coating is selected from zinc, cadmium, tin, copper and copper alloys.

It is a further object of this invention to provide an aluminum article and process of making same having a low friction surface comprising a layer of zinc, a layer of zinc stearate and a layer of stearic acid.

It is a further object of this invention provide fasteners such as nuts and bolts with a low friction surface, as above.

It is a still further object of this invention to provide cupping blanks and other articles which are to be drawn with a low friction surface as above.

It is a still further object of this invention to provide lamp and fuse bases with low friction surfaces as above.

Other objects and advantages will become apparent to those skilled in the art from the following description and drawings, in which:

DESCRIPTION OF THE PREFERRED EMBODIMENTS

Figure 1C:
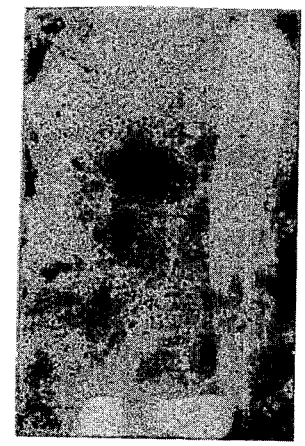
FIG. 1 shows a series of photographs illustrating the behavior in a corrosive environment of aluminum alloy 5005 surfaces coated in accordance with this invention.
Figure 1F:
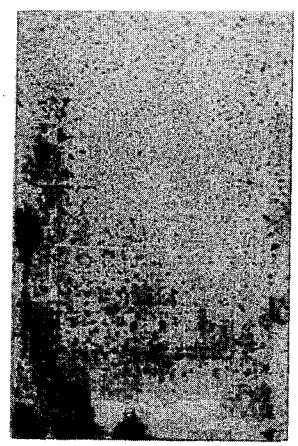
Figure 1I:
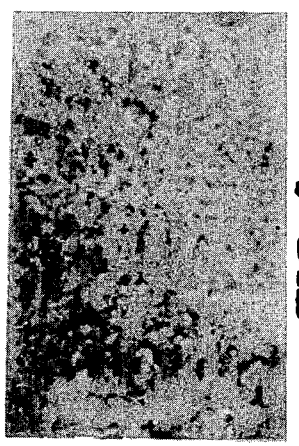
Figure 1B:
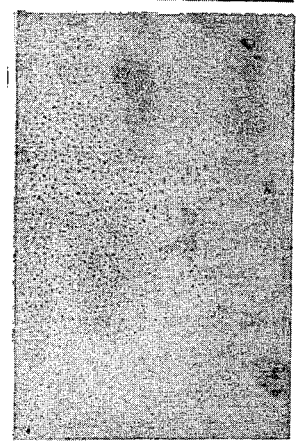
Figure 1E:
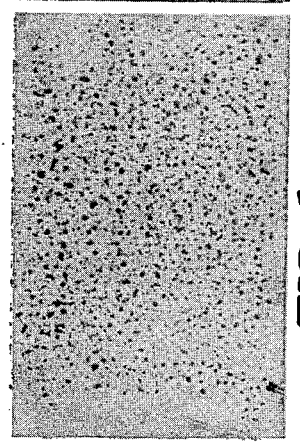
Figure 1H:
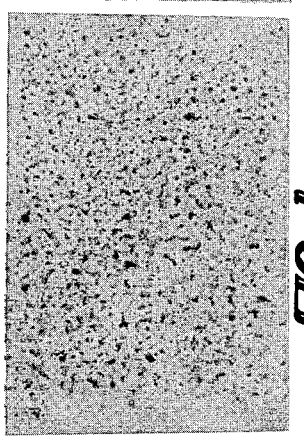
Figure 1A:
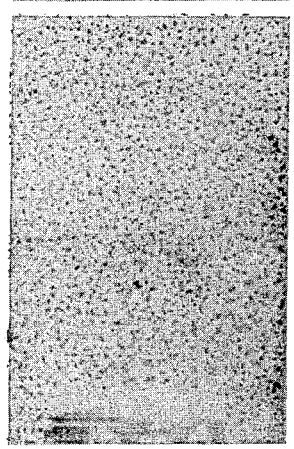
Figure 1D:
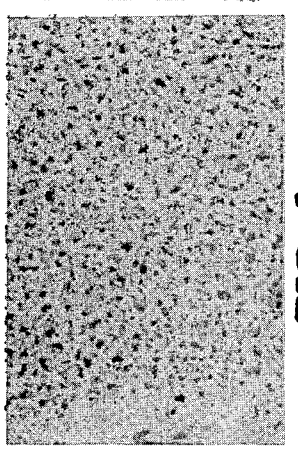
Figure 1G:
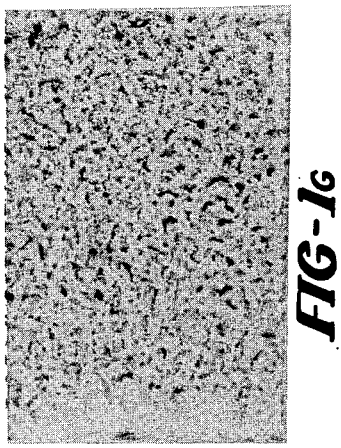

The instant invention consists of substantially replacing the oxide layer on a metal substrate or article made from a metal selected from aluminum, titanium, zirconium, tungsten, niobium, magnesium, nickel and their alloys and stainless steels, with a low friction surface. Stainless steels which may be employed are generally those of the A.I.S.I. 300 series. The invention is preferably applicable to metal substrates or articles selected from aluminum, titanium, magnesium, nickel and their alloys and stainless steels and, in particular, it is most suitable for application to aluminum. For ease of description, the substrates or articles of the aforenoted metals will be referred to generically as metal bases.

The low friction surface which replaces the oxide layer on one of the aforenoted metal bases comprises three layers. The first layer is of a metal selected from zinc, cadmium, bismuth, tin, antimony, lead, iron, copper and copper alloys and, preferably, zinc, cadmium, tin, copper and copper alloys, and most preferably, zinc. The second layer which is coated over the first layer comprises a fatty acid.

The third layer sandwiched between the first and second layers comprises a metal salt or soap which would be formed by reaction of the first and second layers.

The three layer structure plays an important role in the development of the extreme pressure lubrication properties of the substrates or articles. Thus, as the metal salt or soap layer formed between the metal layer and the fatty acid is scraped away in the drawing or other friction producing process, there is a reservoir of fatty acid and metal layer which reacts to provide additional metal salts or soaps which in turn provide additional lubrication.

The process for producing the low friction surface in accordance with this invention comprises providing a metal base which is usually in the form of a substrate or article which may be of any desired shape and is made from a metal selected from the group aluminum, titanium, zirconium, tungsten, niobium, magnesium, nickel and their alloys and stainless steels. Forming a layer of metal selected from the group consisting of zinc, cadmium, bismuth, tin, antimony, lead, iron, copper and copper alloys on the metal base. For ease of description, these metals shall hereinafter be referred to generically as metal coatings. A second layer is formed on the first layer comprising a metal salt or soap of the metal coating. Finally, a third layer comprising a fatty acid is formed on the second layer. Generally, the first and third layers are coated on the base metal and react in part to form the second layer which is sandwiched between them.

The process will now be described in greater detail with reference to a specific embodiment employing aluminum as the metal base, zinc as the metal coating and stearic acid as the fatty acid coating.

The metal coating is applied to the metal base by any of a number of conventional deposition or immersion type processes. Preferably, zinc is applied by a zincating immersion dip, well known in the art. However, it may also be applied electrolytically or by any other suitable method. Generally, the articles are dried before zincating because a residual water film is generally not uniform and the viscous zincating solution used would cause a streaky appearance if the articles were immersed in the zincate bath when wet. However, this is not a necessary requirement.

It is desirable in a large scale process to use a dilute zincate solution to minimize dragout loss as well as preventing streaky coating.

The zincate bath is conventional and has been described in ASTM specification: B253-68 and in U.S. Pat. Nos. 2,650,886 and 2,676,916. The zincate bath operates effectively for two reasons: first, it is strongly alkaline and, therefore, has a strong solubilizing effect on all aluminum oxides; secondly, it contains zinc which is more noble than aluminum and which, therefore, plates out and protects the base metal by replacement. Any system containing these two properties would have potential as an immersion plating step. As aforenoted, other metals such as cadmium, bismuth, tin, antimony, lead, iron, copper and copper alloys would work for this purpose, however, zinc is preferred because it has a high reactivity to stearic acid and is active to aluminum in most corrosion situations so that it should not accelerate the corrosion of aluminum and in fact, as will be shown, it improves the corrosion resistance of aluminum.

Sodium hydroxide is a natural choice for the alkaline metal hydroxide in the zincate bath because of its low cost and ready availability. However, potassium hydroxide, lithium hydroxide, quaternary ammonium hydroxide such as tetramethyl ammonium hydroxide and, in principal, rubidium and cesium hydroxides could also be used, the primary limitation here is cost. A variety of additions can be made to the zincate bath besides ferric chloride and Rochelle salt to improve throwing power, uniformity of coverage and ease of dissolution of oxides on the aluminum. These include but are not limited to chlorides, nitrates, phosphates, polyphosphates and complexing agents such as EDTA and citric acids.

The zincate bath will operate over a wide concentration range from saturation to as low as 1 g.p.l. (gallons per liter) of zinc oxide. Clearly, the higher concentration of zinc in the bath will promote rapid plating and less corrosion of the aluminum. Excesses of caustic will promote dissolution of the oxides so that the range of alkali metal hydroxide concentration goes from just enough to dissolve the zinc oxide to about 500 g.p.l.

The temperature of the zincate bath ranges from room temperature to boiling although room temperature is preferred to promote more uniform depositions. Higher temperatures promote increased plating rates but less uniform and less adherent deposits.

The time in the zincate bath depends on the cleanliness of the surface, the type of base metal alloy and the zincate process conditions. In general, this time will range from 5 seconds to 5 minutes with the preferred time being between 15 and 60 seconds. If the immersion time is too short, spotty coverage and thin zincate deposits result. While excessively long immersion times result in poor adhesion of the zinc to the base metal, a non-uniform zinc layer and pitting and roughening of the aluminum surface.

The molten stearic acid treatment can be carried out under a variety of conditions. Any known fatty acid or mixtures thereof which reacts with the metallic coating may be used providing it is solid at room temperature and its metallic salt or soap is also solid at room temperature. Preferably, fatty acids are saturated and have at least 10 carbon atoms and still more preferably, at least 12 carbon atoms. The treatment temperature ranges from the melting point of the fatty acid to its boiling point, although temperatures in the vicinity of 100° C. are preferred. Stearic acid is the preferred fatty acid and in this temperature range is quite fluid and, therefore, easily wiped from the metal surface to give a thin film. At temperatures less than 75° C., the stearic acid tends to crystallize before wiping and so leaves a rough surface. Higher temperatures above 120° C. are undesirable because of the hazards of fire, fumes and water bumping they entail, together with the additional cost of heating the bath. The main reason for operating at above 100° C. is to minimize the time to heat up the specimen and to facilitate drainage.

The treatment time in the fatty acid should be at least one second. Too long exposures will tend to dissolve away all the zinc. However, a range of time of from one second to 5 minutes is adequate for most treatments.

The fatty acids may be applied in a number of ways. The preferred method is immersion in the molten fatty acid. After the immersion, it is necessary to remove the excess fatty acid before it solidifies. This may be done by any suitable wiping technique such as mechanical wiping or air blast type wiping. Another suitable means for removing the excess fatty acid would be by use of a centrifugal spinner.

The fatty acid can be applied in other ways as well. Most fatty acids, as for example, stearic acid, are soluble in a number of solvents such as ethyl alcohol, benzene, etc. Therefore, they may be placed in solution and applied to the metallic layer as, for example, the zincate surface and allowed to dry. Enough time is then allowed for the solvent to evaporate and the parts heated to about 100° C. to fuse and react the coating. Other fatty acid emulsions or soap solutions can also be used, and may extend the temperature range of the treatment. The fatty acid as, for example, stearic acid may also be applied electrophoretically.

Yet another possibility would be to heat the parts to above 80° C. and then immerse them in a fluidized bed of stearic acid particles. The particles which contacted the hot part would stick and melt to form the coating. The coating thickness would be limited by the cooling of the part so that a very rapid application could be achieved in this way.

The processing steps detailed above are generally applicable with any of the metal bases, metal coatings and saturated fatty acids as will be shown in the examples which follow. One limiting factor, however, must be placed on the method of applying the metal coating to the metal base. If the metal base is less noble than the coating metal, the coating metal may be applied by immersion, however, if the metal base is more noble than the metal coating, it may be applied by electroplating.

The metal coating should be in the form of a strongly adherent particulate deposit. Particulate coatings are coatings which under sufficient magnification appear to be made up of particles. Immersion plates are by their very nature particulate in character which makes them ideal for use with the instant invention. Electrodeposits on the other hand are usually designed to be as uniform as possible so that modifications are necessary to obtain a particulate deposit which is also adherent. This type of deposit is known in the field as a "burned" deposit. Such a deposit is usually obtained when the current density is very high or when a more noble metal impurity is present in trace amounts.

It is also possible for some applications to add substantial amounts of metal soaps other than that of the coating metal to the fatty acid to provide improved performance at elevated temperatures. Specifically, it has been found desirable where the low friction surfaces of this invention is subjected to temperatures in excess of 130° C. to add a substantial amount of a high melting point soap such as lithium stearate to the fatty acid, such that a solid solution of fatty acid in the lithium stearate results.

The invention will now be more fully described with reference to specific examples.

EXAMPLE I

A zincate bath was prepared as follows:

A liter beaker was used and 350 grams of sodium hydroxide was added to the beaker. About 500 mls. of distilled water was added to dissolve the sodium hydroxide. Then 100 grams of zinc oxide (ZnO) was added to this solution and it was stirred until solution was complete. In a separate container 10 grams of Rochelle salt ($NaKC_4H_4O_6$) was dissolved in 50 mls. of distilled water and then 1 g. of ferric chloride ($FeCl_3 \cdot 6H_2O$) was added and stirred until dissolved. This solution was then added to the sodium hydroxide—zinc oxide solution previously prepared and the entire solution was adjusted to a volume of 1 l. by adding distilled water. This zincate solution was then allowed to cool to room temperature for use.

A panel of 3003 aluminum alloy 2 x 4 x .030" in size was cleaned in a nonetch cleaner (Oakite NST—7.5% by volume at 130° F.) for 2 minutes, rinsed well and then etched in a caustic solution (Kemtex NS—6 oz. per gal. at 135° F.) for 1 minute. The panel was rinsed well, immersed in 1–1 nitric acid for a few seconds, rinsed again and then blown dry. The panel was then immersed in the zincate bath for 30 seconds to produce a uniform particulate coating of immersion zinc. The panel was then rinsed, blown dry and immersed in molten stearic acid at 80° C. for 30 seconds, removed and wiped. The panel had a lustrous appearance and was slippery to the touch. When rubbed with another piece of metal, the article showed little resistance as compared to rubbing on a neutral surface.

Coefficient of friction tests

Ten panels of 3003 aluminum alloy were prepared as described above and then tested for coefficient of dynamic friction in a bend test jig. The zinc stearate treated panel yielded a coefficient of friction of 0.091±.0052 as compared to a panel with no treatment which showed a coefficient of friction of 0.204±0.0122. This represents better than a two-fold reduction in the coefficient of friction.

Cupping of high strength aluminum article

Six circles of a high magnesium aluminum alloy 2½" in diameter and 0.030" thick were given the zinc stearate treatment above described except that the time in the zincate bath was increased to 1 minute. A second set of 6 circles was only etched in caustic and de-smutted, a third set of 6 circles was etched in caustic, de-smutted, dried and immersed in the stearic acid. All the circles of metal were then drawn into cups 1¾" in diameter. The force required to effect this cupping operation was measured and the averages and standard deviations are shown below:

Etch only _____ 9190 lbs.±660 lbs.
Etch and stearic acid _____ 8500 lbs.±420 lbs.
Etch and inventive treatment _____ 6150 lbs.±190 lbs.

Clearly the metal circles treated in accordance with this invention require significantly less force to carry out the cupping operation than either the etch only or the etch with stearic acid. This demonstrates the synergistic increase in the low friction properties obtained with the inventive low friction surface.

Drawing with EC aluminum wire

Pieces of EC aluminum wire 0.164" in diameter and 12" long were given the following treatments in accordance with the above processing:

(A) Etch only
(B) Etch and stearic acid
(C) Etch and zincate only
(D) Etch and zincate and stearic acid.

These wires were then placed in a die and drawn to 0.145" diameter. The drawing force and surface condition of the wires was noted. The results are shown below.

(A) Etch only: 265–375 lbs. drawing force (lubricant added—wire broke when drawn without lubrication)
(B) Etch and stearic acid: 140–170 lbs. drawing force—surface gauled
(C) Etch and zincate: 175–220 lbs.—surface gauled
(D) Etch and inventive treatment: 152–158 lbs. drawing force—surface smooth.

The gauling process caused the drawing force to vary substantially. Although the inventive coating did not have the absolutely lowest drawing force in this case, it had the smoothest surface and the least variation in drawing force. Furthermore, the inventive coating was not destroyed by the drawing process and there was no build-up on the die. Therefore, the inventive coating would be available for subsequent draws without reprocessing. This was not the case for coatings (A), (B) and (C).

It has also been found that base metals treated in accordance with this invention may exhibit improved corrosion resistance in environments such as the atmosphere. The following example is illustrative of the improvements which can be obtained.

EXAMPLE II

Aluminum panels 4" x 6" in size were treated as follows:

(1) They were cleaned in a non-etch cleaner at 130° F. for 5 minutes, followed by a rinse.
(2) They were deoxidized in 1–1 nitric acid, followed by a 1 minute rinse.
(3) The panels were immersed in a zincate solution for 1 minute, followed by rinsing, the solution contained 350 g.p.l. NaOH, 100 g.p.l. ZnO, 10 g.p.l. Rochelle salt, 1 g.p.l. $FeCl_3 \cdot 6H_2O$.
(4) The panels were then blown dry.
(5) The panels were then immersed in stearic acid at 100° C. for 1 minute.
(6) The excess stearic acid was wiped off.

Three panels each of both 3003 and 5005 aluminum alloys were given this sequence of steps. In addition, three panels of each alloy were given steps (1) and (4) and designated clean. Three panels of 5005 were also given steps (1), (4), (5) and (6) and designated "stearic acid" for comparison with the effect of stearic acid together with zincate.

The samples thus prepared were tested using the Cass test (ASTM B–368–68). This test employs a 5% NaCl solution adjusted to a pH of 3.1 of acetic acid and containing 1 gram per gallon of $CuCl_2 \cdot 2H_2O$. This solution was sprayed into a cabinet held at 120° F. which holds the panels. The presence of this spray settling on the panels causes severe pitting on bare aluminum.

The panels were exposed for periods of 3, 6 and 22 hours to this environment. Then the panels were rinsed, dried, photographed, cleaned, rephotographed and finally evaluated by means of a stylus. A profilometer equipped with a recorder was used to make traces of the surface. Pitted areas are much rougher than surrounded areas so that a measurement of the area of the surface which is pitted can be estimated from the plot of roughness versus distance. The results from the 3 and 6 hour exposures were amenable to this type of analysis and are shown below.

TABLE I.—PERCENT AREA PITTED IN CASS TEST

| Alloy | Finish | Percent area pitted | |
|---|---|---|---|
| | | 3 hrs. | 6 hrs. |
| 3003 | Clean | 14 | 30 |
| 3003 | Inventive coating | 1.3 | 13 |
| 5005 | Clean | 100 | 100 |
| 5005 | Stearic acid | 53 | 86 |
| 5005 | Inventive coating | 40 | 77 |

These results show that the treatment of this invention was successful in reducing corrosion on the panels in the test.

The panels show the corrosive effect clearly on visual inspection as shown in FIGS. 1 and 2. Referring to FIG. 1, there is shown panels of 5005 alloy treated as follows. FIG. 1a shows a clean panel of 5005 alloy after 3 hours of exposure to the Cass test. FIG. 1b shows a panel with stearic acid only, similarly exposed, and FIG. 1c shows a panel coated in accordance with this invention, similarly exposed. FIG. 1d shows a clean panel of 5005 aluminum alloy exposed to the Cass test for a period of 6 hours. FIG. 1e shows a similar panel with a stearic acid coating only, similarly exposed and FIG. 1f shows a similar panel in accordance with this invention, similarly exposed. FIG. 1g shows a clean panel of 5005 aluminum alloy exposed for 22 hours to the Cass test, and FIG. 1h shows a similar panel coated with stearic acid alone, similarly exposed, and FIG. 1i shows a panel coated in accordance with this invention, similarly exposed.

Figure 2A:
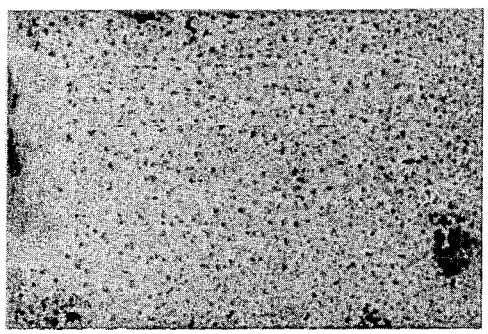
FIG. 2 shows a series of photographs illustrating the behavior in a corrosive environment of aluminum alloy 3003 surfaces coated in accordance with this invention.
Figure 2B:
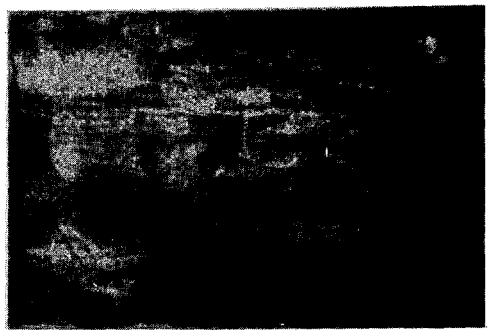
Figure 2C:
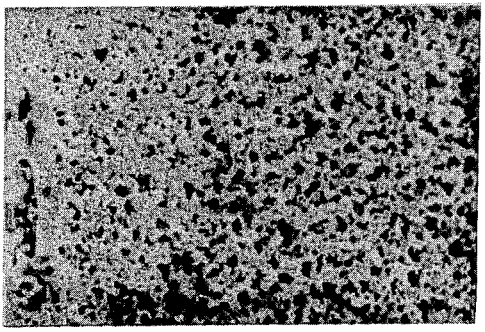
Figure 2D:
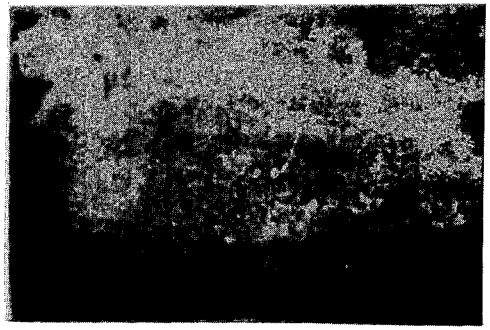
Figure 2E:
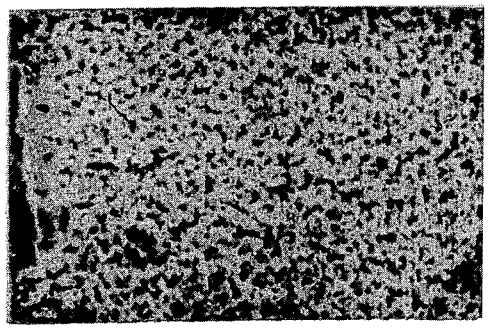
Figure 2F:

Referring to FIG. 2, FIG. 2a represents a clean panel of 3003 alloy after 3 hours of exposure to the Cass test, whereas FIG. 2b is illustrative of a panel in accordance with this invention similarly treated. FIG. 2c is a clean panel of 3003 alloy exposed for 6 hours to the Cass test, whereas FIG. 2d is a panel treated in accordance with invention, similarly exposed. FIG. 2e is a panel of 3003 alloy exposed for 20 hours to the Cass test, whereas FIG. 2f is a panel treated in accordance with this invention similarly exposed.

These photographs amply show the degree of protection against corrosion which is afforded by the coating of this invention. The reduction of pitting in the samples in accordance with this invention is very evident.

All these photographs were taken after the panels were cleaned.

While the examples thus far have dealt with the most preferred embodiment, namely, a base metal of aluminum or aluminum alloy with zinc and stearic acid coatings, the process of this invention is equally applicable to the other systems disclosed as the following examples will show.

EXAMPLE III

A number of flat aluminum panels and ¾" diameter NC nuts and bolts with a variety of immersion plated finishes were tested to establish the frictional characteristics of immersion platings other than zinc. The general processing sequence was as follows:

(1) Rack
(2) Non-etch clean 5 minutes 55° C.
(3) Rinse
(4) Nitric acid solution dip (1 vol. $HNO_3$ to 1 vol. water) room temperature 5 minutes
(5) Rinse
(6) Blow dry
(7) Immersion plate
(8) Rinse
(9) Blow dry
(10) Immersion in molten stearic acid, 100° C., 1 minute
(11) Wipe and blow off excess
(1) Unrack.

The immersion plated coatings which were applied comprised cadmium, brass, copper and zinc as a control. The following list gives the parameters of the immersion plating steps for the respective metal coatings.

IMMERSION PLATING BATH (1) Zinc:
   (A) Compositions: in distilled water
      ZnO—100 g.p.l.
      NaOH—350 g.p.l.
      Rochelle salt—10 g.p.l.
      $FeCl_3 \cdot 6H_2O$—1 g.p.l.
   (B) Temperature—room
   (C) Time— 60 secs.
(2) Cadmium:
   (A) Composition: in distilled water
      $CdSO_4$—3.8 g.p.l.
      48% HF—110 ml./l.
   (B) Temperature—room
   (C) Time—30 secs.

(3) Brass:
  (A) Composition: in distilled water
    ZnO—110 g.p.l.
    NaOH—415 g.p.l.
    CuCN—13 g.p.l.
    NaCN—22 g.p.l.
    $PbCO_3$—0.135 g.p.l.
  (B) Solution filtered after make up
  (C) Temperature—45° C.
  (D) Time—3 minutes (4) Copper:
  (A) Composition: in distilled water
    $CuSO_4 \cdot 6H_2O$—100 g.p.l.
    ethylene diamine—80 ml./l.
  (B) Temperature—room
  (C) Time—2 minutes.

The specimens produced by the above processing were then evaluated for friction and gauling resistance. To test the frictional properties of these surfaces in accordance with this invention, a nut was used to tighten a compressive sleeve on the treated bolts which was equipped with strain gages to measure compressive force. This type of test was also made on a clean bolt, greased bolt and a bolt immersed in stearic acid alone for comparison purposes. The results are shown in the table below.

BOLT STRESS AT VARIOUS APPLIED TORQUES ON VARIOUS FINISHES ¾" NC ALUMINUM ALLOY NUT AND 2024 +6 BOLT

| | Finish torque (ft. lbs.) | | | | |
|---|---|---|---|---|---|
| | 10 | 20 | 30 | 40 | 50 |
| | Bolt stress, k.s.i. | | | | |
| Clean | 1.7 | 3.4 | 5.2 | 6.7 | 8.6 |
| Grease, G332L | 1.9 | 5.8 | 7.6 | 10.3 | 13.5 |
| Stearic acid only | 3.2 | 8.0 | 10.9 | 14.0 | 16.8 |
| Zinc and stearic acid | 3.7 | 8.2 | 12.9 | 16.7 | 19.2 |
| Cadmium and stearic acid | 5.1 | 8.9 | 13.1 | 15.6 | 18.4 |
| Brass and stearic acid | 5.7 | 10.7 | 13.9 | 16.6 | 18.9 |
| Copper and stearic acid | 4.3 | 10.2 | 14.8 | 18.1 | 20.6 |

The results in the table clearly show the synergistic benefit to be derived from coating metal subject to gauling in accordance with the process of this invention which converts a greater amount of applied torque into working force.

EXAMPLE IV

A further aluminum sample was coated by the process of Example III using tin as the metal coating. The parameters of the tin plating bath were as follows:

(A) Composition: in distilled water
    $NaSn(OH)_6$—45 g.p.l.
(B) Temperature—60–70° C.
(C) Time—15–30 secs.

This inventive coating containing tin was not evaluated by the same procedure as in Example III but rather a nut and bolt coated in accordance with this invention was used to compress a rubber annulus. The torque applied to the nut was set with a torque wrench as in Example III, however, the amount of compression of the rubber served to estimate the lubricity of the system.

The results obtained with the tin containing inventive coating were comparable to those obtained with a zinc containing inventive coating, similarly tested.

To illustrate that the invention is applicable to a variety of metal bases, tests were run employing stainless steel, titanium, Inconel alloy 600 and magnesium. These tests will be described in the examples which follow.

EXAMPLE V

Stainless steel is almost always more noble than zinc so that it is necessary to electrodeposit the metal coating. Stainless steel is like aluminum in that it is almost always covered with a protective oxide and also is very prone to gauling. The following finishing sequence was used to obtain a low friction surface in accordance with this invention on both sheet and ¾" diameter NC bolts of A.I.S.I. 304 stainless steel.

(1) Clean—5 min. in 8 oz./gal. non-etch cleaner (Oakite NST) at 130° F.
(2) Rinse
(3) Activate in 1:1 HCl at 150° F. until uniform gassing occurs over the surface
(4) Rinse rapidly
(5) Immerse with hot contact in pyro-zinc plating bath; plate 45 secs. at 6 volts (about 100 a.s.f.) at 150° F.
(6) Rinse
(7) Blow dry
(8) Immerse in molten stearic acid at 220° F. 1 minute
(9) Wipe and blow off excess stearic acid.

The pyro zinc plating bath was prepared with the following composition.

PYRO ZINC PLATING BATH FOR ZINC PLATING

| | G.p.l. |
|---|---|
| $Zn_2P_2O_7$ | 60 |
| $Na_4P_2O_7$ | 100 |
| $FeCl_3 \cdot 6H_2O$ | .25 |

This solution was warmed to bring all the components into solution and then it was filtered. Zinc anodes were used.

The process described above yielded a zinc deposit on the stainless steel which had the characteristic slippery feel of the surface of this invention. Using the treated bolt, a torque wrench was used to tighten a nut onto a compression sleeve which was equipped with strain gages to measure the compressive force. This type of test was also made on a clean bolt and a bolt immersed in molten stearic acid for comparative purposes. The results are shown below.

TORQUE VERSUS STRESS FOR TREATED STAINLESS BOLTS 3/4-10NC

| | Bolt stress, k.s.i. | | |
|---|---|---|---|
| | Clean | Stearic acid | Zinc and stearic acid |
| Torque, ft.-lbs.: | | | |
| 10 | 16.8 | 24.2 | 32.3 |
| 20 | 32.3 | 45.8 | 70.0 |
| 30 | 42.1 | 67.3 | 130.0 |
| 40 | 53.8 | 89.2 | 150.0 |
| 50 | 64.6 | 111.4 | 187.5 |

These results demonstrates that the treated stainless steel bolt was almost three times as effective in converting the applied torque to useful bolting pressure than the cleaned bolt and almost twice as good as the stearic acid bolt.

It is worth noting at this point that the treatment process used is not specific for stainless steel but would apply equally well for almost any metal less active than zinc. The only modification which would be necessary would be in the cleaning-activation steps which are conventional and which would have to be tailored for the particular surface in question.

EXAMPLE VI

A test similar to that carried out in Example V was done using Inconel alloy 600 (nickel, 16% chromium, 8% iron) using ¾" NC bolts. The processing of the Inconel alloy 600 bolts was carried out as follows.

(1) Non-etch clean 10 minutes (soap soak at 130° F.).
(2) Rinse thoroughly in tap water.
(3) Pickel at 10% $HNO_3$+2% HF, room temperature.
(4) Rinse thoroughly in tap water.
(5) Activate in 1 to 1 HCl (40° C.) while in contact with aluminum wire. Remove when bubbling is uniform over entire piece.
(6) Rinse rapidly in tap water.

(7) Plate 15 secs. in pyro zinc plating bath—15 amps, 60° C.
(8) Rinse thoroughly and blow dry.
(9) Immerse in molten stearic acid at 100° C.
(10) Blow off excess stearic acid.

The pyro zinc plating bath composition was the same as in Example V.

Two bolts were treated as above. In addition, two bolts were cleaned and two were given an immersion in molten stearic acid after cleaning for comparison purposes. The tests applied was the same as that set out in Example V and the results are tabulated below.

STRESS IN INCONEL BOLTS AS A FUNCTION OF APPLIED TORQUE

| Torque, ft.-lbs. | Bolt stress in k.s.i. | | | |
|---|---|---|---|---|
| | As received | As cleaned | Stearic acid [1] | Zinc plus stearic acid [1] |
| 10 | 7.5 | 5.2 | 7.2 | 14.1 |
| 20 | 13.8 | 10.9 | 16.5 | 30.8 |
| 30 | 20.6 | 18.8 | 28.3 | 48.5 |
| 40 | 36.9 | 24.8 | 39.0 | 64.2 |
| 50 | 33.3 | 28.4 | 49.4 | 83.2 |

[1] Average of two runs.

The results in the Inconel bolts amply demonstrate the applicability of the low friction surface in accordance with this invention to materials other than aluminum. The low friction surface of this invention on Inconel produces results far superior to those for the as-cleaned or stearic acid coated bolts. In fact, the converted bolt stress with the inventive low friction surface is almost twice as high as that for stearic acid alone and almost three times as high as that for the as-cleaned bolt.

EXAMPLE VII

Nuts and bolts of titanium ¾" NC were also treated in accordance with this invention using the following process sequence.

(1) Non-etch clean—10 minutes at 130° F. Rinse.
(2) 1 to 1 HNO₃ dip—5 min. at room temperature.
(3) Caustic dip 1 min. in 7 oz./gal. NaOH at 130° F. Rinse.
(4) Dip in 1 to 1 HNO₃ 1 min. at room temperature. Rinse.
(5) Immerse plate.
(6) Rinse and blow dry.
(7) Immerse in 220° F. stearic acid
(8) Blow off excess.

Zinc was again chosen as the metal coating and the immersion plating bath conditions were:

Zinc—
  HF (52%) 150 mil/l.
  ZnO 30 g.p.l.
  Room temperature
  15 secs. immersion.

Bolts which were cleaned only or which were cleaned and coated with stearic acid were used for comparative purposes. The test which was carried out was essentially the same as that carried out in Examples V and VI and the results are shown below.

STRESS IN TITANIUM BOLTS AS A FUNCTION OF APPLIED TORQUE

| Torque, ft.-lbs. | Bolt stress in k.s.i. | | | | |
|---|---|---|---|---|---|
| | As received | As cleaned | Stearic acid [3] | Zinc plus stearic acid [3] | Zinc plus stearic acid [2] |
| 10 | 0.8 | 1.8 | 1.5 | 5.3 | 1.3 |
| 20 | 5.0 | 5.0 | 3.8 | 12.0 | 9.8 |
| 30 | 9.9 | 9.8 | 7.2 | 20.0 | 16.8 |
| 40 | 15.6 | 14.9 | 10.9 | 28.3 | 23.7 |
| 50 | 21.1 | 19.8 | 15.1 | 36.5 | 30.1 |

[1] Average of 4 runs.
[2] Bolt treated only—nut clean.
[3] Average of 2 runs—nut and bolt treated.

These results clearly show that the low friction surface in accordance with this invention was substantially better than that of a titanium bolt treated with stearic acid alone. They also show that having both nut and bolt treated was better than the bolt alone. This test also shows as with Examples V and VI that the inventive surface of the instant invention is useful with metal bases other than aluminum which have strongly adherent oxides on their surfaces and which are, therefore, highly prone to gauling.

EXAMPLE VIII

Magnesium was also selected as a base metal for coating in accordance with this invention. The pyro zinc plating bath described above for the stainless steels was used to put an immersion zinc coating on magnesium. This required about 30 seconds after nonetch cleaning. The coated specimen was then rinsed, dried and immersed in stearic acid at 100° C. The zinc was not very adherent and so tended to wipe off after immersion in stearic acid. However, the coating which did remain appeared to be effective. The above results in Examples V to VIII illustrate the effectiveness of the low friction surface in accordance with this invention on metal bases other than aluminum.

The pretreatments prior to forming the metal coating on the metal base which are set forth in the examples herein are considered conventional and do not form an essential part of the invention herein. Generally, it is necessary to clean the metal base so that it is free of organic residues, heavy oxides and foreign materials. As shown in the examples, this can be accomplished by conventional etch and non-etch cleaners.

The low friction surface of this invention is useful on threaded articles, such as nuts, bolts, screws, threaded rods, pipes and fittings since it provides a greater conversion of applied torque into working force. It is also useful on threaded articles such as lamp bases and fuse bases to prevent sticking during fabrication and in use. The surface is also useful on bearing surfaces such as knock down aluminum shipping containers, windows, ladders and cartridge cases. The surface is also useful for low temperature applications such as snow shovels to prevent sticking of snow to the shovel. It is applicable to metal blanks subjected to deep drawing such as in wire drawing, cold heading, impacted extrusion and spinning. Other uses should be apparent.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:
1. An article having a low friction surface comprising:
   a metal base of a metal selected from the group consisting of aluminum, titanium, zirconium, tungsten, niobium, magnesium, nickel and their alloys and stainless steels;
   a low friction coating on a surface of said metal base consisting of three layers, the first layer comprising a metal coating adjacent to said metal base, said metal coating being of a metal selected from the group consisting of zinc, cadmium, bismuth, tin, antimony, lead, iron, copper and copper alloys, the second layer adjacent said first layer being a metal soap or salt of said metal in said first layer, and adjacent said second layer the third layer being a fatty acid.
2. An article as in claim 1 wherein said metal base is selected from the group consisting of aluminum, titanium, magnesium, nickel and their alloys and stainless steels.
3. An article as in claim 2 wherein said metal coating is selected from the group consisting of zinc, cadmium, tin, copper and copper alloys.

4. An article as in claim 3 wherein said metal base is aluminum or an aluminum alloy.

5. An article as in claim 3 wherein said metal coating is zinc.

6. An article as in claim 5 wherein said fatty acid is stearic acid.

7. A process of forming a low friction anti-gauling surface on a metal article which comprises: providing a metal base selected from the group consisting of aluminum, titanium, zirconium, tungsten, niobium, magnesium, nickel and their alloys and stainless steels; forming a metal layer of a metal selected from the group consisting of zinc, cadmium, bismuth, tin, antimony, lead, iron, copper and copper alloys on said metal base; forming a layer of fatty acid on said metal layer; and reacting in part said fatty acid and said metal layers to form intermediate said fatty acid and said metal layers a layer of a metal soap or salt of said metal in said metal layer.

8. A process as in claim 7 wherein said metal base is selected from the group consisting of aluminum, titanium, magnesium, nickel, and their alloys and stainless steels.

9. A process as in claim 8 wherein said metal layer is selected from the group consisting of zinc, cadmium, tin, copper and copper alloys.

10. A process as in claim 9 wherein said metal base is formed of aluminum or an aluminum alloy.

11. A process as in claim 10 wherein said metal layer is zinc.

12. A process as in claim 11 wherein said fatty acid layer is stearic acid.

References Cited

UNITED STATES PATENTS

| | | | |
|---|---|---|---|
| 1,242,532 | 10/1917 | Dreymann | 117—134 |
| 1,613,808 | 1/1927 | Schreiber | 148—6.14 R |
| 2,108,641 | 2/1938 | Blodgett | 117—134 |
| 2,871,140 | 1/1959 | Goss | 117—134 |

ALFRED L. LEAVITT, Primary Examiner

C. K. WEIFFENBACH, Assistant Examiner

U.S. Cl. X.R.

117—71 M, 134